United States Patent [19]
Mistrater et al.

[11] Patent Number: 5,324,049
[45] Date of Patent: Jun. 28, 1994

[54] MANDREL WITH FLARED, DISH SHAPED DISK AND PROCESS FOR USING MANDREL

[75] Inventors: Alan B. Mistrater; Stanley J. Pietrzykowski, Jr.; Alfred O. Klein, all of Rochester; Loren E. Hendrix, Webster; Mark C. Petropoulos, Ontario; Gary A. Batt, Fairport; Alan D. Smith, Henrietta, all of N.Y.

[73] Assignee: Xerox Corporation, Stamford, Conn.

[21] Appl. No.: 996,431

[22] Filed: Dec. 23, 1992

[51] Int. Cl.⁵ .......................... B23B 31/40; B66C 1/56
[52] U.S. Cl. .................. 279/2.17; 198/803.7; 269/48.1; 294/93
[58] Field of Search ............. 279/2.01, 2.1–2.12, 279/2.17, 2.22; 269/48.1; 242/68.2, 72 R; 294/93; 414/910; 198/803.7–803.9, 803.12; 118/500

[56] References Cited

U.S. PATENT DOCUMENTS

| 574,763 | 1/1897 | Rudolph | 279/2.17 X |
|---|---|---|---|
| 3,777,875 | 12/1973 | Sobran | 198/131 |
| 3,945,486 | 3/1976 | Cooper | 198/179 |
| 4,680,246 | 7/1987 | Aoki et al. | 430/133 |

FOREIGN PATENT DOCUMENTS

| 0217778 | 1/1985 | Fed. Rep. of Germany | 294/93 |
|---|---|---|---|
| 1156896 | 5/1958 | France | 279/2.17 |

*Primary Examiner*—Steven C. Bishop

[57] ABSTRACT

A mandrel for transporting a hollow cylinder including an elongated arm, a dish shaped disk adjacent one end of the elongated arm, the dish shaped disk having a flexible lip flared inclined away from the elongated arm, the flared flexible lip having a circular outermost edge, and a reciprocable presser means adapted to partially flatten at least a portion of the flexible lip adjacent to and including the outermost edge of the lip toward the elongated arm to increase the length of the circumference of the circular outermost edge of the lip. This mandrel is used in a process for coating hollow cylinders.

7 Claims, 3 Drawing Sheets

MANDREL WITH FLARED, DISH SHAPED DISK AND PROCESS FOR USING MANDREL

BACKGROUND OF THE INVENTION

This invention relates in general to an improved mandrel for transporting hollow cylinders and, more specifically, to a mandrel and process for using the mandrel for coating hollow cylinders.

Although this invention is especially useful for the fabrication of electrostatographic imaging members, it is not limited to such application. Electrostatographic imaging members are will known in the art and include electrophotographic imaging members and electrographic imaging members.

Electrophotographic imaging member may be in the shape of a hollow drum or cylinder and are coated with at least one active electrophotographic imaging layer. The active electrophotographic imaging layer may comprise a single photoconductive layer or comprise a plurality of active electrophotographic layers such as a charge generating layer and a charge transport layer. These drum shaped electrophotographic imaging members embodiments are well known in the art.

Electrostatographic drums are conventionally coated by immersing hollow cylinders into a liquid coating solution, withdrawing the cylinders coated with the coating solution and drying the coating on the cylinders. Generally, the coating applied to the cylinder is confined to the exterior surface of the cylinder to conserve coating material, to avoid heat build-up, and to provide an internal contact surface for electrical contact for electrical grounding or biasing. To prevent any significant deposition of coating material onto the interior of the cylinder during immersion of the substrate into the coating bath, the cylinder axis is maintained in a vertical position or attitude and air within the hollow cylinder is trapped in at least the lower section of the interior of the cylinder by various known techniques. Trapping of the air in the cylinder while the cylinder axis is maintained in a vertical attitude minimizes wasteful deposition of coating material within the interior of the cylinder. One technique for trapping air within the cylinder is to insert the lower end of a mandrel into the upper open end of a cylinder, the mandrel having an expandable component positioned at or adjacent to its lower end which can be expanded to firmly contact and grip the interior of the cylinder to form a seal which traps air in the section of the cylinder below the seal during immersion of the cylinder in a coating liquid. One such technique is described in U.S. Pat No. 4,680,246, the entire disclosure thereof being incorporated herein by reference. In another embodiment, the expandable mandrel component has a shape similar to that of a disk or thick washer. The outside diameter of this expandable disk shaped member, in its normal unstressed state, is slightly less than the interior diameter of the cylinder that is transported by the mandrel. The axis of this disk is coaxial with the main mandrel body. The expandable disk is expanded by applying compressive pressure on at least a segment of the upper and lower surfaces of the disk. The applied compression pressure causes the length of the circumference of the circular outermost edge of the disk to increase sufficiently whereby the outer periphery of the disk firmly contacts and grips the interior surface of the cylinder so that the mandrel can support and carry the cylinder from one location to another and also function as an air seal to trap air within the interior of the cylinder in the section below the cylinder when the cylinder is immersed in a liquid coating bath. The compressive pressure may be applied to the disk by applying a pulling or tension force on a tension shaft extending from a presser means through the center of the disk and through the mandrel body whereby the disk is squeezed by the presser means against the adjacent lower end of the mandrel body. The use of a mandrel that supports a hollow cylinder by gripping only the interior of the cylinder facilitates coating of the exterior surface of the cylinder without any mechanical object contacting either the exterior surface of the cylinder or the coating deposited on the exterior surface. The mandrel is supported at its upper end by any suitable conventional conveyor means. The conveyor means can comprise means to raise and lower the mandrel and/or the entire conveyor means may be raised and lowered by any suitable and conventional means such as an elevator means.

Although expandable disk shaped members made of natural or synthetic rubber or elastomers such as ethylene-propylene terpolymer perform well for a dip coating step, it has been found necessary that the freshly coated cylinder be supported on a metallic platen for transportation through a drying device or zone because the expandable disk or inflatable bladder tends to stick to the interior wall of a cylinder and inhibit or prevent mandrel removal after exposure to elevated temperatures during drying of the deposited coating. Also, the memory properties of the expandable disk or expandable bladder material degrade rapidly when repeatedly exposed to temporary compression or expansion forces and elevated drying temperatures. Degradation of the memory properties prevents the material from returning to its original shape and size after distortion. This, in turn, can cause difficulties in separating the disk or inflatable bladder from the interior wall of a cylinder. In addition, expansion of disk by application of compressive pressure requires especially high pressures that shorten the cycling life of the disk.

Expandable bladders also require a compressed fluid source, complex air tubing and couplings, air seals and the like which greatly increase the likelihood of failure during a coating or drying operation. For example, an air leak can cause a coated cylinder to fall away from a mandrel during or after coating. If a drum falls into a coating bath or onto the floor of a drying oven, the entire coating line must be shut down to remove the fallen drum and to repair the leak. Moreover, the large contact area between an inflated bladder and the interior of a cylinder presents heat transfer problems that ultimately result in coatings that have undesirable non-uniform physical and electrical characteristics following drying.

INFORMATION DISCLOSURE STATEMENT

U.S. Pat. No. 4,680,246 to Aoki et al, issued Jul. 14, 1987—A method is disclosed for holding a hollow cylindrical body without a bottom without contacting the outside surface thereof and immersing the body in a liquid with which the outside surface of the cylindrical body is to be coated and preventing the liquid from contacting the inside wall of the cylindrical body. The method utilizes a device which includes an inflatable elastic membrane which tightly contacts the inside wall of the cylindrical body and holds the body when it is inflated by supply of compressed fluid. A process for producing an electrophotographic element is also disclosed including the steps of holding the hollow cylindrical body without a bottom, immersing the cylindrical body in a liquid containing a photosensitive material and separating the cylindrical body from the liquid to form a uniform photosensitive layer only on the outside surface thereof.

U.S. Pat. No. 3,945,486 to Cooper, issued Mar. 23, 1976—Apparatus is disclosed for releasably supporting and transporting rigid open-mouthed containers by engaging the interior surface of the container mouth with an inflatable elongated elastomeric diaphragm, means being provided for inflating and deflating the diaphragm. The apparatus is particularly useful in suspending and conveying heated glass bottles through various processing stages wherein various coatings are applied to the outer surfaces of the bottles. The elastomeric diaphragm may be molded from a silicone rubber elastomer.

U.S. Pat. No. 3,777,875 to Sobran, issued Dec.11, 1973—A hanger or support apparatus is disclosed for suspending a container by engagement with the interior wall of the opening portion of the container. Means are provided for quickly engaging and disengaging the hanger. The hanger is particularly adapted for suspending heated glass bottles for conveyance through an electrostatic coating apparatus.

In copending application entitled "MANDREL WITH EXPANDABLE HIGH TEMPERATURE ELASTOMERIC POLYMER DISK AND PROCESS FOR USING MANDREL", Docket Number D/92601, Ser. No. 07/996,430, filed Dec. 23, 1992, a mandrel is disclosed comprising a mandrel for transporting a hollow cylinder comprising an elongated arm having an imaginary axis, an expandable disk shaped member having at least one hole and a circular outermost edge, the disk shaped member being mounted on and coaxially aligned with one end of the arm and comprising an elastomeric polymer material having a durometer of between about 25 and about 35 and a maximum continuous use temperature rating of at least about 230° C., and means mounted on the mandrel to apply compressive pressure to the disk shaped member to increase the length of the circumference of the circular outermost edge. This mandrel is used in a process for coating hollow cylinders. The entire disclosure of this application is incorporated herein by reference.

In copending application entitled "SELF ADJUSTING MANDREL WITH EXPANDABLE ELASTOMERIC DISK AND PROCESS FOR USING MANDREL", Docket Number D/92602, Ser. No. 07/995,489, filed Dec. 23, 1992, a mandrel is disclosed comprising a mandrel comprising an elongated arm having a first end and a second end, a reciprocatable shaft coaxially aligned with and extending through the arm, a first end of the shaft extending beyond the first end of the arm and a second end of the shaft extending beyond the second end of the arm, a presser means mounted at the first end of the shaft, an expandable disk shaped member coaxially aligned with and slidably mounted on the shaft between the presser means and the first end of the arm, a compression means mounted on the second end of the shaft, and a resilient helical spring coaxially aligned with and slidably mounted on the shaft between the presser means and the compression means, the compression means adopted to apply compression pressure to the disk shaped member and to the helical spring. The entire disclosure of this application is incorporated herein by reference.

In copending application entitled "LOW ENERGY TRANSFER MANDREL AND PROCESS FOR USING MANDREL", Docket Number D/92603, Ser. No. 07/996,227, filed Dec. 23, 1992, a mandrel is disclosed comprising an elongated arm having a first end and a second end, a reciprocatable shaft coaxially aligned with and extending through the arm, a first end of the shaft extending beyond the first end of the arm and a second end of the shaft extending beyond the second end of the arm, a presser means mounted at the first end of the shaft, an expandable disk shaped member coaxially aligned with and slidably mounted on the shaft between the presser means and the first end of the arm, a compression means mounted on the second end of the shaft, and a resilient helical spring coaxially aligned with and slidably mounted on the shaft between the presser means and the compression means, the compression means adopted to apply compression pressure to the disk shaped member and to the helical spring. The entire disclosure of this application is incorporated herein by reference.

In copending application entitled "Dip Coating Process Material Handling System", Docket Number D/92600, Ser. No. 07/995,491, filed Dec. 23, 1992, a dip coating system for applying and drying coatings is disclosed that is capable of using the mandrel of this invention. The entire disclosure of this application is incorporated herein by reference.

SUMMARY OF THE INVENTION

It is, therefore, an object of the present invention to provide an improved mandrel and process of using the mandrel which overcomes the above-noted deficiencies.

It is another object of the present invention to provide an improved mandrel which requires lower pressures to expand a gripping component.

It is still another object of the present invention to provide an improved mandrel which resists deterioration when subjected to high temperatures.

It is yet another object of the present invention to provide an improved mandrel which withstands cyclic temperature excursions.

It is another object of the present invention to provide an improved mandrel which is resistant to chemical fumes.

It is yet another object of the present invention to provide an improved mandrel having and expandable component that retains plastic memory when repeatedly subjected to simultaneous heating and compressing.

The foregoing objects and others are accomplished in accordance with this invention by providing a mandrel for transporting a hollow cylinder comprising an elongated arm, a dish shaped disk adjacent one end of the elongated arm, the dish shaped disk having a flexible lip flared inclined away from the elongated arm, the flared flexible lip having a circular outermost edge, and a reciprocable presser means adapted to partially flatten at least a portion of the flexible lip adjacent to and including the outermost edge of the lip toward the elongated arm to increase the length of the circumference of the circular outermost edge of the lip. This mandrel is used in a process for coating hollow cylinders.

BRIEF DESCRIPTION OF THE DRAWINGS

A more complete understanding of the process of the present invention can be obtained by reference to the accompanying drawings wherein.

The figures are merely schematic illustrations of the prior art and the present invention. They are not intended to indicate the relative size and dimensions of mandrels or components thereof.

DETAILED DESCRIPTION OF THE DRAWINGS

Figure 1:
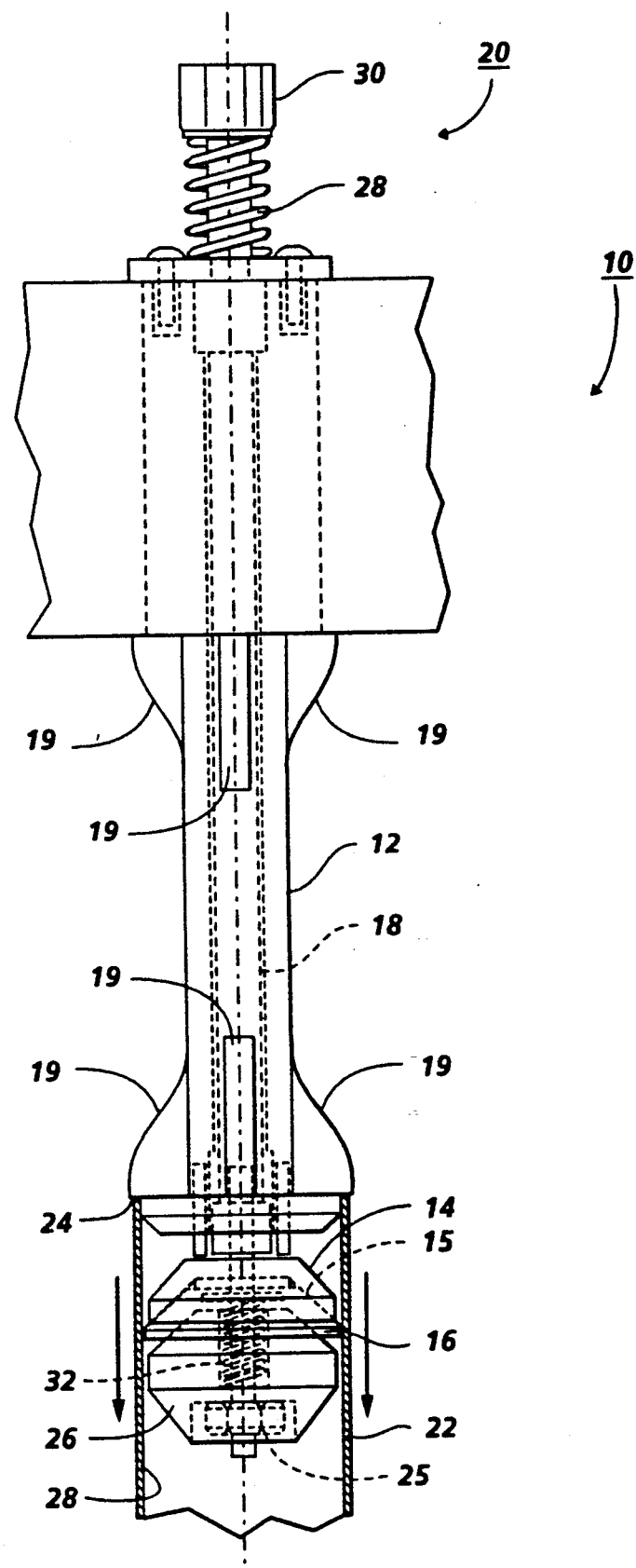
FIG. 1 is a schematic illustration of a sectional view in elevation of a mandrel of this invention prior to expansion of a flexible lip.

Referring to FIG. 1, a mandrel 10 is shown comprising an elongated arm 12, a substantially rigid dish shaped member 14, a dish shaped disk 15 having a flared flexible lip 16, a tension shaft 18, tension applying means 20 attached to the upper end of tension shaft 18 and mounted and supported by the upper end of elongated arm 12, upper and lower fins 19, and hollow cylinder 22. Elongated arm 12 may be supported by a collar segment 23 of a conveyor system. The upper edge of hollow cylinder 22 is seated against alignment shoulder 24 formed in lower fins 19 to ensure that hollow cylinder 22 is coaxially aligned with the axis of mandrel 10. The bottom of lower fins 19 protrude slightly into the interior of the top of hollow cylinder 22. Secured to the lower end of tension shaft 18 by a threaded nut 25 is a presser means 26. Tension applying means 20 may comprise any suitable means capable of pulling tension shaft 18 upwardly, such as a helical spring 28 and nut 30 which is threaded above a washer onto the threaded upper end of tension shaft 18. Other typical tension applying means may include devices such as, for example, solenoids, two way acting air cylinders, screws, levers, notched ramps, cam devices, and the like. Helical spring 32 provides a bias to separate dish shaped disk 15 from presser means 26 when tension applying means 20 is inactivated. Inactivation of tension applying means 20 may be accomplished by any suitable technique such as supplying electricity to or terminating the supplying of electricity to a solenoid or other appropriate device (not shown) which pushes nut 30 and tension shaft 18 downwardly. Downward movement of tension shaft 18 causes a corresponding downward movement of presser means 26 which allows helical spring 32 to separate dish shaped disk 15 from presser means 26. This allows flared flexible lip 16 of dish shaped disk 15 to relax and retract away from the interior wall 28 of hollow cylinder 22. With flared flexible lip 16 of dish shaped disk 15 to relax and retract away from the interior wall 28 of hollow cylinder 22, mandrel 10 may be introduced into the interior of hollow cylinder 22 or removed therefrom.

Figure 2:
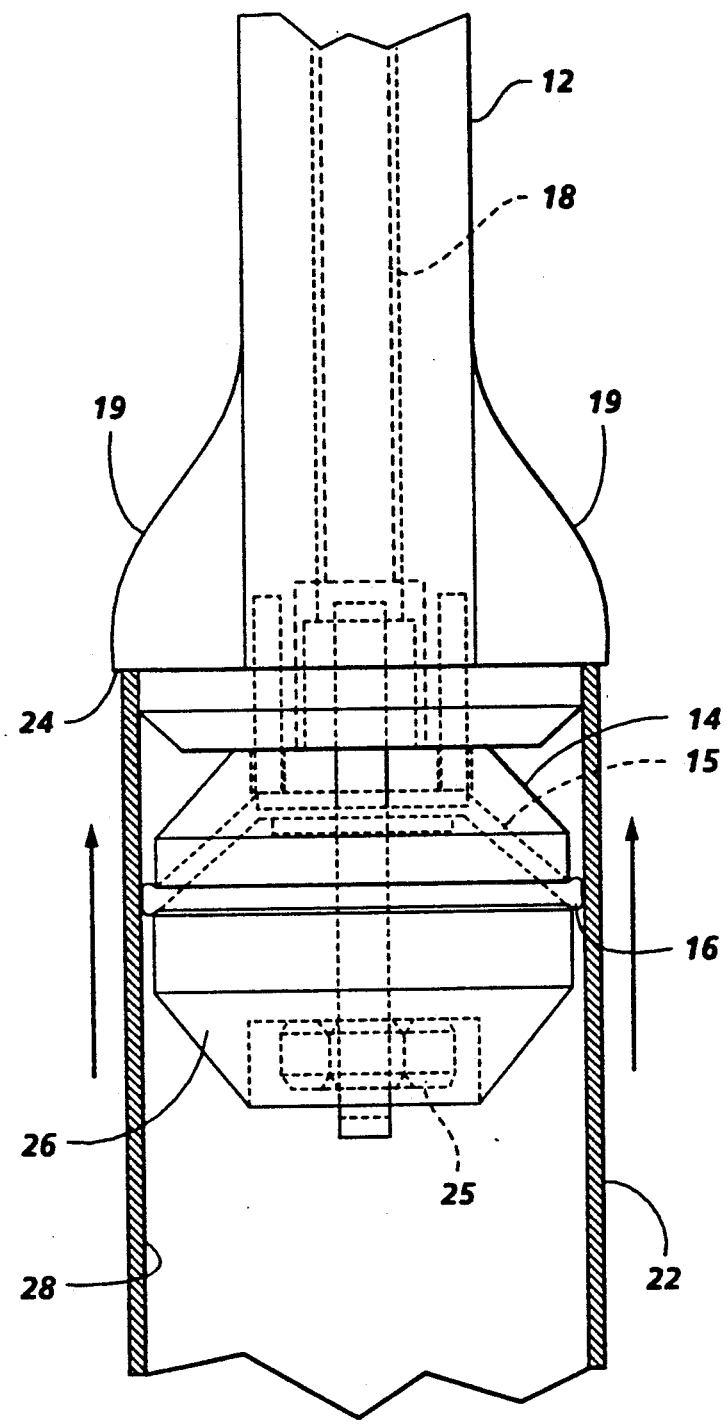
FIG. 2 is an expanded partial view of the schematic illustration shown in FIG. 1 after expansion of a flexible lip.

In FIG. 2, tension applying means 20 is activated by removing the source of downward pressure on nut 30 and tension shaft 18 so that helical spring 28 can urge tension shaft 18 upwardly. Upward movement of tension shaft 18 causes a corresponding upward movement of presser means 26 which compresses helical spring 32 and brings the truncated cone shaped upper surface of presser means 26 against the flared flexible lip 16 and partially flattens the flared flexible lip 16 against the flared skirt of dish shaped disk 15. Since the circular outermost edge of the flared flexible lip 16 extends beyond the extremities of the circular outermost edge of the flared skirt of dish shaped disk 15, the length of the circumference of the circular outermost edge of flared flexible lip 16 is increased by the upward movement of presser means 26 whereby the outermost edge of flared flexible lip 16 contacts, frictionally grips and forms an air tight seal with the interior wall 28 of hollow cylinder 20.

Figure 3:
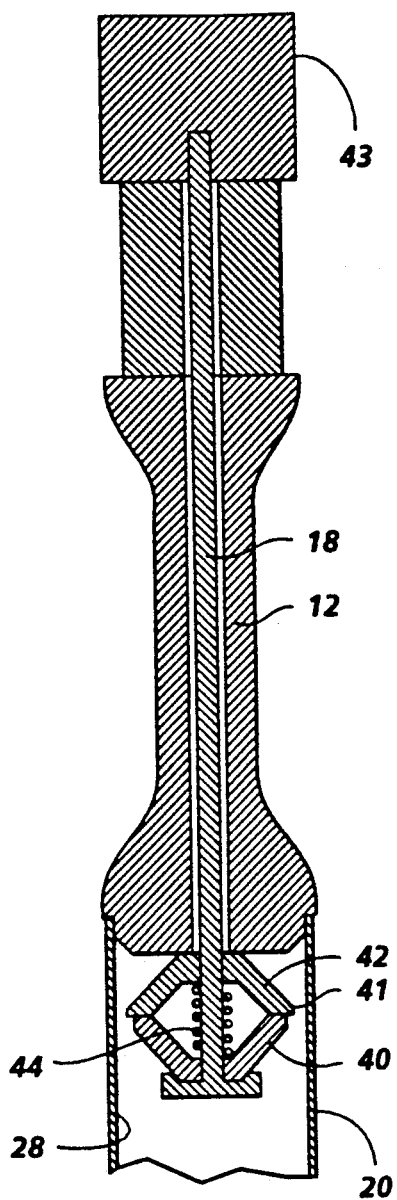
FIG. 3 is a schematic illustration of a sectional view in elevation of another embodiment of a mandrel of this invention prior to expansion of a flexible lip.
Figure 4:
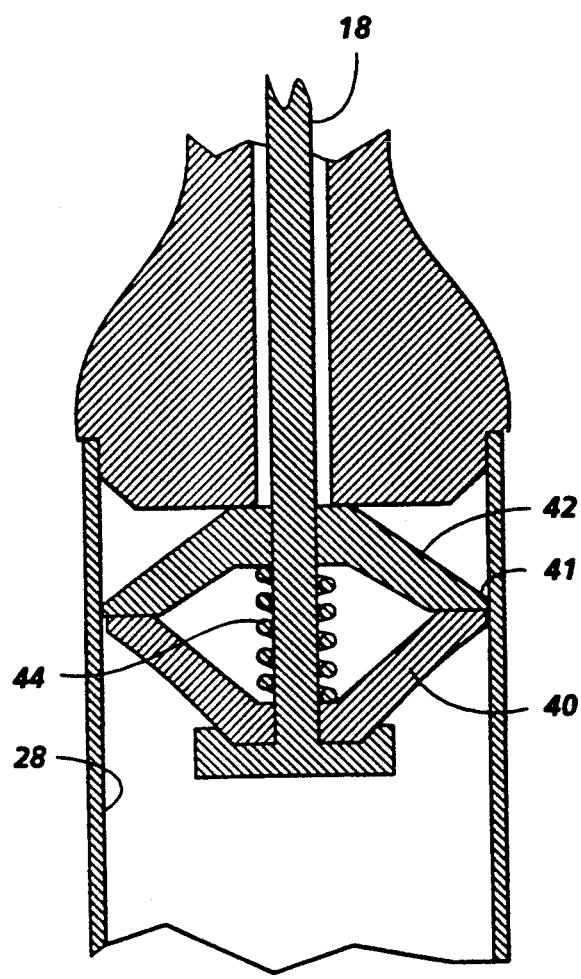
FIG. 4 is an expanded partial view of the schematic illustration shown in FIG. 3 after expansion of a flexible lip.

Depicted in FIG. 3 is an anternative presser means comprising a presser means comprising second dish shaped member 40 comprising a substantially planar circular base encircled by a flared skirt extending outwardly from and inclined away from the plane of the base and toward the flexible lip 41 of dish shaped disk 42. Second dish shaped member 40 may have a solid planar circular base that is integral with tension shaft 18 (not shown) or comprise a multicomponent base as illustrated in FIGS. 3 and 4. The length of the circumference of the circular outermost edge of the flexible lip 41 of dish shaped disk 42 is longer than the length of the circumference of the circular outermost edge of the flared skirt of the second dish shaped member 40. Flexible lip 41 of dish shaped disk 42 is in a relaxed condition with the tension applying means 43 in an inactivated mode to allow tension shaft 18 and presser means comprising second dish shaped member 40 to be urged downwardly by helical spring 44.

As illustrated in FIG. 4, the tension applying means (not shown) has been activated to urge tension shaft 18 upwardly, the upward movement of tension shaft 18 causing a corresponding upward movement of second dish shaped member 40 against the flexible lip 41 of dish shaped disk 42 to partially flatten the outermost edge of the flared flexible lip of dish shaped disk 42 toward elongated arm 12 thereby causing the flared flexible lip of dish shaped disk 42 to contact, frictionally grip and form an air tight seal with the interior wall 28 of hollow cylinder 20.

The dish shaped disk 42 having a flared flexible lip 41 contains a hole to accommodate reciprocal movement of a tension shaft. The hole may be of any suitable shape. Typically, the hole is circular to avoid concentration of stress during compression. A single central hole is preferred for reasons of simplicity and maximization of component durability. A plurality of holes in the dish shaped disk 42 having a flared flexible lip 41 and mandrel1elongated arm 12 increases device complexity and can reduce the strength of the mandrel arm.

The extreme circular outermost edge of the flared flexible lip 41 may be of any suitable shape including rounded, flat, angular, or the like. Also, the flared flexible lip 41 may have a uniform thickness or have a tapered thickness, e.g. from the center of disk 42 toward the extreme circular outermost edge. Further, the circular outermost edge of flared flexible lip 41 may have a chisel shaped cross section to minimize contact area between flexible lip 41 and the interior wall 28 of cylinder 22 thereby reducing heat transfer.

The minimum size of the dish shaped disk can vary considerably depending upon the size of the cylinder to be supported and the means utilized to apply partially flatten the flexible lip whereby the outside diameter of the disk expands sufficiently to contact and frictionally grip the interior surface of the cylinder. The thickness of the flexible lip should be at least about 1.8 millimeters when it is unsupported on the back side (i.e. the side opposite the presser means). A thickness of at least about 1.5 millimeters is preferred for lips that are partially supported on the back side. Generally the thickness of an unsupported flexible lip should be less than about 2.0 millimeters and less than about 1.7 millimeters for partially supported lips to provide sufficient flexibility. These thickness are also affected by the flexibility of the material used in the lips, the amount of partial support on the back side, and the means utilized to partially flatten the lips to increase the outside diameter of the disk. If supported on the backside, The flexible lips utilized in the disks of this invention utilize a high durometer flexible polymeric elastomer to effect a small positive outward distension or elongation of the outer circumference in response to a small compression along the central axis of the disk. A small or low durometer elastomer of the same shape would have very little or no tendency to increase its diameter but rather it would simply "squash" or compress. Thus a "donut" shaped expandable elastomer that is compressed on its top and bottom, i.e. compressed in a direction parallel to the axis of the donut, requires a much greater mass of elastomer than the disk and lip concept of this invention. In general the donut type of expansion member requires much more compression to accomplish the same equivalent change in diameter achived with the disk and lip concept of this invention. The elastomeric material employed in the expandable disk shaped member with flexible lips of this invention should preferably have a durometer between about 40 and about 100 for satisfactory performance. Generally, when the durometer is less than about 40, the elastomer tends to adhere to the interior of the hollow cylinders thereby preventing or rendering difficult release of the cylinder from the mandrel. Durometers greater than about 100 prevent adequate deformation thereby preventing the disk to increase in diameter sufficiently to support a hollow cylinder. Preferably, the elastomer has a durometer between about 60 and about 90. Optimum results are achieved with a durometer between about 75 and about 85.

The elastomeric material utilized in the expandable dish shaped disk should also have an ASTM maximum continuous use temperature rating of at least about 230° C. to retain its memory properties and to avoid chemical and physical degradation during repeated compression and high temperature cycling while coating a plurality of hollow cylinders. The expression "maximum continuous use temperature rating" as employed herein is defined as the maximum temperature at which the elastomer can maintain substantially all of its original shape prior to heating and remain chemically stable without decomposing.

Any suitable high temperature resistant elastomeric polymer having the aforesaid durometer and maximum continuous use temperature characteristics may be utilized. The disk elastomeric polymer should also should be inert and resistant to the solvents utilized in the coating mixtures. Typical elastomers having a durometer of between about 50 and about 100 and a maximum continuous use temperature rating of as much as 230° C. include, for example, elastomeric fluorocarbon rubbers, silicone rubbers, fluorosilicone rubbers, ethylene propylene rubber, and the like. Optimum results are achieved with fluoroelastomeric copolymers of vinylidene fluoride and hexafluoropropylene. Fluoroelastomeric copolymers of this type are available under the trademark Viton, available from E. I. dupont de Nemours & Company. Some of these copolymers are stable and flexible at temperatures as high as about 232° C. (450° F.) for short periods of time. Another example of a preferred high temperature resistant polymer is a terpolymer elastomer of ethylene-propylenediene monomer, an elastomer based on stereospecific linear terpolymers of ethylene, propylene and small amounts of a nonconjugated diene such as a cyclic or aliphatic diene (hexadiene, dicyclopentadiene, or ethylidene norbornene), the unsaturated part of the terpolymer molecule is pendent from the main chain which is completely saturated. This terpolymer is resistant to temperatures as high as 205° C.

Although metals are deformable under sufficient applied pressure, they are thermally conductive and form a heat sink at the point of contact with the interior surface of the cylinder thereby cooling the cylinder at the contact point which in turn causes deformation of the coating during drying at elevated temperatures. Thus, the expandable disk shaped member should comprise an elastomeric polymer material having a durometer of between about 40 and about 100.

Typically, the average radial distance between the circular outermost edge of the flexible lip and the interior surface of the cylinder prior to fpartial flattening of the lip is about 250 micrometers (0.01 inch). This spacing allows the disk to be readily introduced into the interior of the cylinder prior to expansion of the disk and allows the cylinder to fall away by gravity from the disk after the outer circumference of the disk is contracted. Preferably, the maximum average radial distance between the outermost surface of the flexible lip and the inner surface of the cylinder prior to disk expansion is about 500 micrometers (0.020 inch). Distances greater than about 500 micrometers tend to increase the length of the dish shaped disk having a flexible lip during cycling. More specifically, extensive flattening of the lip followed by release of the flattening pressure to allow the lip to return to its original shape develops unwanted memory effect which gradually prevents complete return of the partially flattened lip to its original shape when extensively cycled. This decreases the life of the lip dramatically. The average radial distance between the outermost surface of the lip and the inner surface of the cylinder prior to disk expansion should at least be sufficient to permit the disk to be easily slid into the interior of the hollow cylinder.

Any suitable means may be utilized to partially flatten the flexible lip. Generally, partial flattening is achieved by deflecting the lip by contacting with a presser means at least a ring like zone on the side of the lip opposite the elongated arm adjacent to, but not at the circular outermost edge the presser means. The presser means may have any suitable shape such as the truncated cone shaped surface as illustrated in FIGS. 1 and 2 or a second dish shaped member comprising a substantially planar circular base encircled by a flared skirt extending outwardly from and inclined away from the plane of the base and toward the flexible lip as shown in FIGS. 3 and 4. The presser means should apply sufficient pressure to the lip to increase the length of the circumference of the circular outermost edge of the lip and to effectively seal the hole in the dish shaped disk having the flexible lip. The presser means is activated or inactivated by means of a reciprocatable tension shaft. One end of the presser shaft is secured to the presser means and the other end of the shaft extends through the elongated arm of the mandrel to a means for moving the shaft in an axial direction toward the presser means or away from the presser means. Movement of the shaft toward the presser means removes the partial flattening force applied to the flexible lip whereas movement of the shaft in a direction away from the compressor means causes the presser means to partial flatten the flexible lip. Any suitable means may be utilized to apply tension to the tension shaft. A tension supplying means may simply be, for example, a nut threaded onto the tension shaft. Activation of the tension supplying means by screwing the nut onto the tension shaft in the direction of the mandrel body places the tension shaft under tension which in turn pulls the presser means toward the flexible lip to partially flatten the lip. Other typical tension supplying means include solenoids, two way acting air pistons, hydraulic pistons, coil springs, air cylinders, latching cams, screws, levers, notched ramps, cam devices, and the like. Means for reciprocating the shaft in one direction or another include any suitable device such as a cam, solenoid, two-way acting air piston, motor driven crank shaft in which the reciprocal shaft functions as a connecting rod, screws, levers, notched ramps, cam devices, and the like.

Generally, the partial flattening pressure applied to a lip is adjusted at room temperature to a predetermined cylinder pull off force. For example, a pull off force of about 20 pounds for pulling a hollow cylinder off of a mandrel having a partially flattened lip at room temperature is satisfactory for transporting a hollow cylinder weighing about 80 to about 120 grams. Obviously the pull off force varies with the weight of the hollow cylinders to be transported. Typically, a pull off force at room temperature can range from about 1 pound to about 30 pounds depending on the actual weight selected for most conventional aluminum cylinders. A pull off force greater than about 30 pounds is usually undesirable because the gripping force causes elastomer memory degradation and increases the heat sink characteristics of the expandable donut.

The mandrel may be supported at its upper end by any suitable conveyor means. The conveyor means can comprise means to grip the upper end of the mandrel, such as a collar or chuck. The tension applying means may be manually activated or inactivated by an operator or automatically by any suitable and conventional electric or fluid supply means controlled by switches or valves. The mandrels may be raised and lowered manually or by any suitable and conventional reciprocatable means such as a ball and screw, two way acting air piston, hydraulically actuated pistons, chain & gear systems, screw & block systems, cams, ramps, cranes, and the like. The mandrel and/or the entire conveyor means may be raised and lowered by any suitable and conventional means such as an elevator means.

Generally, the cylinders are immersed into a liquid coating mixture until only a small uncoated band around the uppermost end of the cylinder remains above the level of the liquid coating material bath. This prevents deposition of cobe utili the small band. This uncoated band may be utilized for electrically grounding the cylinder during electrophotographic imaging, if the cylinder is electrically conductive. The uncoated band can also be used to support spacers which ride on the uncoated area to space other subsystems out of contact with the coated drum. Also, total immersion of the cylinder in the coating mixture is undesirable because the coating mixture can overflow the top edge of the cylindrical cylinder and form unwanted deposits on the mandrel, disk and interior of the cylinder. Although dip coating may be effected by moving the drum vertically downward into a coating liquid bath, dip coating may also be accomplished by moving the coating liquid bath, upwardly or by a combination of these movements. For purposes of convenience, all these movements are considered as encompassed by the expression "immersing". Means for lowering and raising the mandrel are well known among those skilled in the art and the detailed description thereof is omitted herein.

There are various cylindrical electrostatographic imaging member embodiments. Typically, a hollow cylindrical substrate is provided having an electrically conductive surface. For electrophotographic imaging members, at least one photoconductive layer is then applied to the electrically conductive surface. An optional charge blocking layer may be applied to the electrically conductive layer prior to the application of the photoconductive layer. If desired, an adhesive layer may be utilized between the charge blocking layer or conductive layer and the photoconductive layer. For multilayered photoreceptors, an electrophotographic imaging layer comprising a charge generation layer and a charge transport layer is usually applied onto the underling surface. For ionographic imaging members, an electrically insulating dielectric layer is applied to the electrically conductive surface.

The cylindrical substrate, i.e. hollow cylinder is usually opaque but can be substantially transparent. The hollow cylinder may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which are molded or extruded into hollow cylinders. The electrically insulating or conductive substrate is relatively rigid.

The thickness of the cylindrical substrate depends on numerous factors, including rigidity and economical considerations, and thus may be of substantial thickness, for example, about 4 millimeters, or of a minimum thickness of about 50 micrometers, provided there are no adverse effects on the final electrostatographic device. The surface of the substrate layer is preferably cleaned prior to coating to promote greater adhesion of the deposited coating. Cleaning may be effected, for example, by exposing the surface of the substrate layer to plasma discharge, ion bombardment and the like.

If the bulk of the cylindrical substrate is electrically insulating it is provided with an electrically conductive surface layer. The conductive layer may vary in thickness over substantially wide ranges depending on the optical transparency desired for the electrostatographic member. The conductive layer may be an electrically conductive metal layer formed, for example, on the substrate by any suitable coating technique, such as a vacuum depositing technique. A typical electrical conductivity for conductive layers for electrophotographic imaging members in slow speed copiers is about $10^2$ to $10^3$ ohms/square. Generally, the entire hollow cylindrical substrate comprises a single metal such as aluminum, nickel, common alloys of aluminum, rigid plastics, and the like.

An optional charge blocking and/or adhesive layers may be applied to the electrically conuctive surface of a hollow cylinder for photoreceptors. Charge blocking and adhesive charge layers are well known in the art and usually comprise a film forming component and a solvent. Any suitable charge blocking and/or adhesive layer well known in the art may be utilized. Typical charge blocking and/or adhesive layer materials include, for example, nylon, polyesters, polyurethanes, and the like. For convenience in obtaining thin layers, the blocking and/or adhesive layers are preferably applied by immersion of the cylinder in a dilute solution bath, with the solvent being removed after deposition of the coating by conventional drying techniques such as forced air heating, infrared radiation heating, and the like. The blocking layer should be continuous and have a uniform thickness.

Any suitable photogenerating layer may be applied to the blocking and/or adhesive blocking layer. The photogenerating layer is then overcoated with a contiguous hole transport layer as described hereinafter. Examples of typical photogenerating layers include inorganic or organic photoconductive particles dispersed in a solvent solution of a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved. Drying of the immersion deposited coating to remove solvent may be effected by any suitable conventional technique such as oven drying, infra red radiation drying, air drying and the like.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in the multilayered photoconductor of this invention comprises from about 25 percent to about 75 percent by weight of at least one charge transporting aromatic amine compound, and about 75 percent to about 25 percent by weight of a polymeric film forming resin in which the aromatic amine is soluble.

The charge transport layer forming mixture may comprise any suitable charge transporting molecule disolved or molecularly dispersed in a solvent solution of a film forming binder. Any suitable resin binder dissolved in a solvent may be employed in the process of this invention. Typical inactive resin binders soluble in methylene chloride include polycarbonate resin, polyvinylcarbazole, polyester, polyarylate, polyacrylate, polyether, polysulfone, and the like. Molecular weights can vary, for example, from about 20,000 to about 150,000.

Generally, the thickness of the hole transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Examples of photosensitive members having at least two electrically operative layers include the charge generator layer and diamine containing transport layer members disclosed in U.S. Pat. Nos. 4,265,990, 4,233,384, 4,306,008, 4,299,897 and 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

Drying of the deposited coating to remove solvent may be effected by any suitable conventional technique such as oven drying, infra red radiation drying, vacuum drying, ambient air flow drying, compressed air drying, and the like.

Optionally, an overcoat layer may also be utilized to improve resistance to abrasion. Overcoatings are continuous and generally have a thickness of less than about 10 micrometers.

For electrographic imaging members, a dielectric layer overlying the conductive layer may be substituted for the photoconductive layers. Any suitable, conventional, flexible, electrically insulating dielectric film forming polymer may be used in the dielectric layer of the electrographic imaging member. The polymer is dissolved in a solvent when applied by immersion coating. Drying of the deposited coating to remove solvent may be effected by any suitable conventional technique such as oven drying, infra red radiation drying, vacuum drying, ambient air flow drying, compressed air drying, and the like.

The mandrel of this invention withstands the temperature excursions, chemicals, and chemical fumes associated with the immersion coating and processing of hollow cylinders.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

An aluminum drum having an inside diameter of about 39 mm, a wall thickness of 1.0 mm and a length of about 130 mm was mounted onto a mandrel. The mandrel comprised an elongated, generally cylindrically shaped high performance plastic (ALTEM) arm having a length of about 13 mm and an average diameter less than about 50 min. The arm contained a hole extending axially through the arm from one end of the arm to the other. An expandable circular disk with a outside diameter of 37 mm, a thickness of 2 mm, an edge thickness of 1.8 mm, and shaped member having a design configuration as detailed in FIG. 1 was attached to the mandrel with its attendant supporting pieces as also noted of; upper and lower TEFLON supports, stainless steel retaining pins (3), helical spring, Washers, assembly screw and insulating cap. These were assembled and adjusted onto a finned design mandrel as described in the embodiment and FIG. 1. The disc shaped member was cut and ground to the specifications as noted in the embodiment, from a sample of VITON elastomer. The polymer had a durometer of about 70 and a maximum continuous use temperature rating of about 230° C. The disk was mounted onto one end of the arm by means of a tension shaft. The tension shaft had a diameter of 10 millimeters and a length of 20 cm. The free end of the shaft was threaded through the hole in the expandable circular disk and through the hole extending through the elongated plastic arm. The free end of the shaft extended about 5 cm beyond the end of the elongated plastic arm. The free end of the shaft was threaded and was fitted with a washer and nut. The nut was tightened at room temperature until a pull off pressure of about 35 pounds was required to slide the drum off of the mandrel. The drum was then carried by the mandrel and was vertically (attitude of drum axis) heated in a forced air oven at a temperature of about 155° C. for about 30 minutes. It was found that this disc shape was also totally acceptable in all regards. The retentive strength or "pull-off force" remained constant at all test modes and temperatures. The shape did not distort at 'cool-down', nor did it display any memory effects. It had no tendency to stick to the inside of the contacting surface of the drum. There was no degradation to the polymer due to solvent exposure. The disk showed, as evidenced by substrate surface temperature data logging, no appreciable heat-sink properties. Accordingly, this polymer was replicated in the designated profiles as illustrated. In each case the same or similar results were obtained. Rigorous temperature data was recorded from the mandrel surface adjacent to the substrate. Temperature data was also recorded in minute detail from the surface of the substrate all along its length but most particularly at its contact point with the mandrel fins or chamfer surface. This data clearly showed an average improvement in the temperature profile of approximately 5 degrees C., for the finned mandrel, with the VITON flare disc shape and its attendant supporting pieces as noted. This translated to an improved heat-up and cool down cycle for the substrate which is directly related to an improved coating and subsequently improved electrostatic properties of the photoreceptor.

EXAMPLE II

An aluminum drum having an inside diameter of about 39 mm, a wall thickness of 1.0 mm and a length of about 130 mm was mounted onto a mandrel. The mandrel comprised an elongated, generally cylindrically shaped high performance plastic (RYTON) arm having a length of about 13 mm and an average diameter less than about 50 min. The arm contained a hole extending axially through the arm from one end of the arm to the other. An expandable circular disk with a outside diameter of 37 mm, a thickness of 2 mm, an edge thickness of 1.8 mm, and shaped member having a design configuration as detailed in FIG. 1 was attached to the mandrel with its attendant supporting pieces as also noted of; upper and lower TEFLON supports, stainless steel retaining pins (3), helical spring, Washers, assembly screw and insulating cap. These were assembled and adjusted onto a finned design mandrel as described in the embodiment and FIG. 1. The disc shaped member was cut and ground to the specifications as noted in the embodiment, from a sample of SILICONE elastomer. The polymer had a durometer of about 70 and a maximum continuous use temperature rating of about 230° C. The disk was mounted onto one end of the arm by means of a tension shaft. The tension shaft had a diameter of 10 millimeters and a length of 20 cm. The free end of the shaft was threaded through the hole in the expandable circular disk and through the hole extending through the elongated plastic arm. The free end of the shaft extended about 5 cm beyond the end of the elongated plastic arm. The free end of the shaft was threaded and was fitted with a washer and nut. The nut was tightened at room temperature until a pull off pressure of about 35 pounds was required to slide the drum off of the mandrel. The drum was then carried by the mandrel and was vertically (attitude of drum axis) heated in a forced air oven at a temperature of about 155° C. for about 30 minutes. It was found that, this disc shape, was also totally acceptable in all regards. The retentive strength or "pull-off force" remained constant at all test modes and temperatures. The shape did not distort at 'cool-down', nor did it display any memory effects. It had no tendency to stick to the inside of the tubes' contacting surface. There was no degradation to the polymer due to solvent exposure. The disc showed, as evidenced by substrate surface temperature data logging, no appreciable heat-sink properties. Accordingly, this polymer was replicated in the designated profiles as illustrated. In each case the same or similar results were obtained. Rigorous temperature data was recorded from the mandrel surface adjacent to the substrate. Temperature data was also recorded in minute detail from the surface of the substrate all along its length but most particularly at its contact point with the mandrel fins or chamfer surface. This data clearly showed an average improvement in the temperature profile of approximately 5 degrees C., for the finned mandrel, with the SILICONE flare disc shape and its attendant supporting pieces as noted. This translated to an improved heat-up and cool down cycle for the substrate which is directly related to an improved coating and subsequently improved electrostatic properties of the photoreceptor.

EXAMPLE III

An aluminum drum having an inside diameter of about 39 mm, a wall thickness of 1.0 mm and a length of about 130 mm was mounted onto a mandrel. The mandrel comprised an elongated, generally cylindrically shaped high performance plastic ( RYTON ) arm having a length of about 13 mm and an average diameter less than about 50 min. The arm contained a hole extending axially through the arm from one end of the arm to the other. Two expandable circular disks, with a outside diameter of 37 mm, a thickness of 4.0 mm, an edge thickness of 1.8 mm, and shaped member having a design configuration as detailed in FIG. 3 and FIG. 4 were attached to the mandrel with its attendant supporting pieces as also noted of; stainless steel helical spring. These were assembled and adjusted onto a finned design mandrel as described in the embodiment and FIG. 1. The disc shaped member(s) were cut and ground to the specifications as noted in the embodiment, from a sample of SILICONE elastomer. The polymer had a durometer of about 70 and a maximum continuous use temperature rating of about 230° C. The disk was mounted onto one end of the arm by means of a tension shaft. The tension shaft had a diameter of 10 millimeters and a length of 20 cm. The free end of the shaft was threaded through the hole in the expandable circular disk and through the hole extending through the elongated plastic arm. The free end of the shaft extended about 5 cm beyond the end of the elongated plastic arm. The free end of the shaft was threaded and was fitted with a washer and nut. The nut was tightened at room temperature until a pull off pressure of about 35 pounds was required to slide the drum off of the mandrel. The drum was then carried by the mandrel and was vertically (attitude of drum axis) heated in a forced air oven at a temperature of about 155° C. for about 30 minutes. It was found that this disc design, was also totally acceptable in all regards. The retentive strength or "pull-off force" remained constant at all test modes and temperatures. The shape did not distort at 'cool-down' nor did it display any memory effects. It had no tendency to stick to the inside of the tubes' contacting surface. There was no degradation to the polymer due to solvent exposure. The disk showed, as evidenced by substrate surface temperature data logging, no appreciable heat-sink properties. Accordingly, this polymer was replicated in the designated profiles as illustrated. In each case the same or similar results were obtained. Rigorous temperature data was recorded from the mandrel surface adjacent to the substrate. Temperature data was also recorded in minute detail from the surface of the substrate all along its length but most particularly at its contact point with the mandrel fins or chamfer surface. This data clearly showed an average improvement in the temperature profile of approximately 5 degrees C., for the finned mandrel, with the SILICONE flare disc shape and its attendant supporting pieces as noted. This translated to an improved heat-up and cool down cycle for the substrate which is directly related to an improved coating and subsequently improved electrostatic properties of the photoreceptor.

EXAMPLE IV

An aluminum drum having an inside diameter of about 39 mm, a wall thickness of 1.0 mm and a length of about 130 mm was mounted onto a mandrel. The mandrel comprised an elongated, generally cylindrically shaped high performance plastic (ALTEM) arm having a length of about 13 mm and an average diameter less than about 50 min. The arm contained a hole extending axially through the arm from one end of the arm to the other. Two expandable circular disks, with a outside diameter of 37mm, a thickness of 4.0 mm, an edge thickness of 1.8 mm, and shaped member having a design configuration as detailed in FIG. 3 and FIG. 4 were attached to the mandrel with its attendant supporting pieces as also noted of; stainless steel helical spring. These were assembled and adjusted onto a finned design mandrel as described in the embodiment and FIG. 1. The disc shaped member(s) were cut and ground to the specifications as noted in the embodiment, from a sample of VITON elastomer. The polymer had a durometer of about 70 and a maximum continuous use temperature rating of about 230° C. The disk was mounted onto one end of the arm by means of a tension shaft. The tension shaft had a diameter of 10 millimeters and a length of 20 cm. The free end of the shaft was threaded through the hole in the expandable circular disk and through the hole extending through the elongated plastic arm. The free end of the shaft extended about 5 cm beyond the end of the elongated plastic arm. The free end of the shaft was threaded and was fitted with a washer and nut. The nut was tightened at room temperature until a pull off pressure of about 35 pounds was required to slide the drum off of the mandrel. The drum was then carried by the mandrel and was vertically (attitude of drum axis) heated in a forced air oven at a temperature of about 155° C. for about 30 minutes. It was found that, this disk design, was also totally acceptable in all regards. The retentive strength or "pull-off force" remained constant at all test modes and temperatures. The shape did not distort at 'cool-down', nor did it display any memory effects. It had no tendency to stick to the inside of the tubes' contacting surface. There was no degradation to the polymer due to solvent exposure. The disk showed, as evidenced by substrate surface temperature data logging, no appreciable heat-sink properties. Accordingly, this polymer was replicated in the designated profiles as illustrated. In each case the same or similar results were obtained. Rigorous temperature data was recorded from the mandrel surface adjacent to the substrate. Temperature data was also recorded in minute detail from the surface of the substrate all along its length but most particularly at its contact point with the mandrel fins or chamfer surface. This data clearly showed an average improvement in the temperature profile of approximately 5 degrees C., for the finned mandrel, with the VITON flare disc shape and its attendant supporting pieces as noted. This translated to an improved heat-up and cool down cycle for the substrate which is directly related to an improved coating and subsequently improved electrostatic properties of the photoreceptor.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A mandrel for transporting a hollow cylinder comprising an elongated arm, a dish shaped disk adjacent one end of said elongated arm, said dish shaped disk having a flexible lip flared inclined away from said elongated arm, said flexible lip having a circular outermost edge, a substantially rigid dish shaped member mounted between said dish shaped disk and said end of said elongated arm, said dish shaped member comprising a substantially planar circular base encircled by a flared skirt extending outwardly from and inclined away from the plane of said base and away from said elongated arm, said skirt having a circular outermost edge, said dish shaped disk having said flared flexible lip contacting the side of said dish shaped member opposite said elongated arm, said circular outermost edge of said flared flexible lip extending beyond the extremities of said circular outermost edge of said skirt, and a reciprocable presser means adapted to partially flatten at least a portion of said flexible lip adjacent to and including said outermost edge of said lip toward said elongated arm to increase the length of the circumference of said circular outermost edge of said flexible lip.

2. A mandrel according to claim 1 wherein said flexible lip comprises an elastomeric polymer having a durometer between about 40 and about 100.

3. A mandrel according to claim 1 wherein said reciprocable presser means adapted to partially flatten at least a portion of said flexible lip comprises a truncated cone shaped member.

4. A mandrel according to claim 1 wherein said reciprocable presser means is supported on one end of a reciprocable tension shaft axially extending through said dish shaped disk, said dish shaped member and said elongated arm.

5. A mandrel for transporting a hollow cylinder comprising an elongated arm, a dish shaped disk adjacent one end of said elongated arm, said dish shaped disk having a flexible lip flared inclined away from said elongated arm, said flared flexible lip having a circular outermost edge, and a reciprocable presser means adapted to partially flatten at least a portion of said flexible lip adjacent to and including said outermost edge of said lip toward said elongated arm to increase the length of the circumference of said circular outermost edge of said lip, said reciprocable presser means comprising a dish shaped member comprising a substantially planar circular base encircled by a flared skirt extending outwardly from and inclined away from the plane of said base and toward said flexible lip.

6. A mandrel for transporting a hollow cylinder comprising an elongated arm, a dish shaped disk adjacent one end of said elongated arm, said dish shaped disk having a flexible lip flared inclined away from said elongated arm, said flexible lip having a circular outermost edge, and a reciprocable presser means adapted to partially flatten at least a portion of said flexible lip adjacent to and including said outermost edge of said lip toward said elongated arm to increase the length of the circumference of said circular outermost edge of said lip, said reciprocable presser means comprising a second dish shaped member comprising substantially rigid second dish shaped member comprising a substantially planar circular base encircled by a flared skirt extending outwardly from and inclined away the plane of said base and away from said flexible lip.

7. A mandrel for transporting a hollow cylinder comprising an elongated arm, a dish shaped disk adjacent one end of said elongated arm, said dish shaped disk having a flexible lip flared inclined away from said elongated arm, said flexible lip having a circular outermost edge, a reciprocable presser means adapted to partially flatten at least a portion of said flexible lip adjacent to and including said outermost edge of said lip toward said elongated arm to increase the length of the circumference of said circular outermost edge of said lip, and a helical spring between said dish shaped disk and said presser means, said helical spring being adapted to bias said dish shaped disk away from said presser means.

* * * * *